(12) United States Patent
Motoe

(10) Patent No.: US 7,502,224 B2
(45) Date of Patent: Mar. 10, 2009

(54) ELECTRONIC APPARATUS HAVING A CONNECTOR CONNECTING A DISK DRIVE

(75) Inventor: Hironori Motoe, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 502 days.

(21) Appl. No.: 11/294,131

(22) Filed: Dec. 5, 2005

(65) Prior Publication Data

US 2006/0134940 A1 Jun. 22, 2006

(30) Foreign Application Priority Data

Dec. 20, 2004 (JP) ............................. 2004-367459

(51) Int. Cl.
*G06F 1/16* (2006.01)
(52) U.S. Cl. ...................... 361/685; 361/683
(58) Field of Classification Search .......... 361/679–868
See application file for complete search history.

(56) References Cited

U.S. PATENT DOCUMENTS

| | | | | |
|---|---|---|---|---|
| 5,124,887 A | * | 6/1992 | Kobayashi | .................. 361/685 |
| 6,273,273 B1 | * | 8/2001 | Liao | ............................. 211/26 |
| 6,388,876 B1 | * | 5/2002 | Chen | ........................... 361/685 |
| 6,507,487 B1 | * | 1/2003 | Barina et al. | ................. 361/685 |
| 6,529,373 B1 | * | 3/2003 | Liao et al. | .................... 361/685 |
| 6,563,701 B1 | * | 5/2003 | Peng et al. | ................... 361/685 |
| 6,754,071 B2 | * | 6/2004 | Lin et al. | ..................... 361/685 |
| 7,257,827 B2 | * | 8/2007 | Lee | ............................. 720/653 |
| 2002/0021551 A1 | * | 2/2002 | Kashiwagi | ................... 361/683 |

FOREIGN PATENT DOCUMENTS

| | | |
|---|---|---|
| JP | 05-289776 | 11/1993 |
| JP | 11-242881 | 9/1999 |
| JP | 2003-297068 | 10/2003 |

* cited by examiner

*Primary Examiner*—Lisa Lea-Edmonds
(74) *Attorney, Agent, or Firm*—Blakely, Sokoloff, Taylor & Zafman LLP.

(57) ABSTRACT

An electronic apparatus includes a main body having a receptacle, and a disk drive accommodated in the receptacle. A connector is provided in the receptacle. The connector is rotatable between an accommodated position and a standing position. The disk drive is removably connected to the connector and rotatable together with the connector. The receptacle is covered with a removable lid.

4 Claims, 7 Drawing Sheets

ELECTRONIC APPARATUS HAVING A CONNECTOR CONNECTING A DISK DRIVE

CROSS-REFERENCE TO RELATED APPLICATIONS

This application is based upon and claims the benefit of priority from prior Japanese Patent Application No. 2004-367459, filed Dec. 20, 2004, the entire contents of which are incorporated herein by reference.

BACKGROUND

1. Field

The present invention relates to an electronic apparatus, such as notebook computers, with a connector connecting a disk drive.

2. Description of the Related Art

Notebook computers have a hard disk drive (hereinafter referred to as "HDD") which stores, for example, information input from a keyboard. The HDD is fabricated as a separate unit. This kind of HDD is removably accommodated in a housing of the computer.

Computers from which an HDD is removable have a receptacle in the bottom of its housing. The receptacle is formed of a recess having a size corresponding to an HDD, and having an opening portion opened in a bottom surface of the housing. The opening portion of the receptacle is covered with a removable cover.

The HDD has a first connector at one end. The receptacle of the housing has a second connector corresponding to the first connector. The first connector is engaged with the second connector when the HDD is accommodated in the receptacle of the housing. This engagement enables electrical connection between the HDD and the computer and transmission/reception of data between them.

In conventional computers, the HDD is dropped into the receptacle, and then the HDD is slid toward the second connector. This slide makes the first connector of the HDD engaged with the second connector. However, in the conventional computers, it is necessary to secure a space for allowing slide of the HDD between the second connector and the HDD. This increases the size of the receptacle and is against recent demands for more compact computers.

Jpn. Pat. Appln. KOKAI Pub. No. 5-289776 discloses a computer in which a rotatable connector is provided in a receptacle of a housing. According to this computer, an HDD rotates together with the connector, and thus the HDD is easily removed from the receptacle. However, this computer still has a problem in respect of shock resistance of the HDD.

Jpn. Pat. Appln. KOKAI Pub. No. 11-242881 discloses an HDD to which shock absorbent members are attached. Although this invention increases the shock resistance of the HDD, it decreases in workability in fitting the HDD into the receptacle and removing the HDD from the receptacle.

BRIEF DESCRIPTION OF THE SEVERAL VIEWS OF THE DRAWING

The accompanying drawings, which are incorporated in the constitute a part of the specification, illustrate embodiments of the invention, and together with the general description given above and the detailed description of the embodiments given below, serve to explain the principles of the invention.

DETAILED DESCRIPTION

An embodiment of the present invention is explained on the basis of drawings, in which the present invention is applied to a notebook computer.

Figure 1:
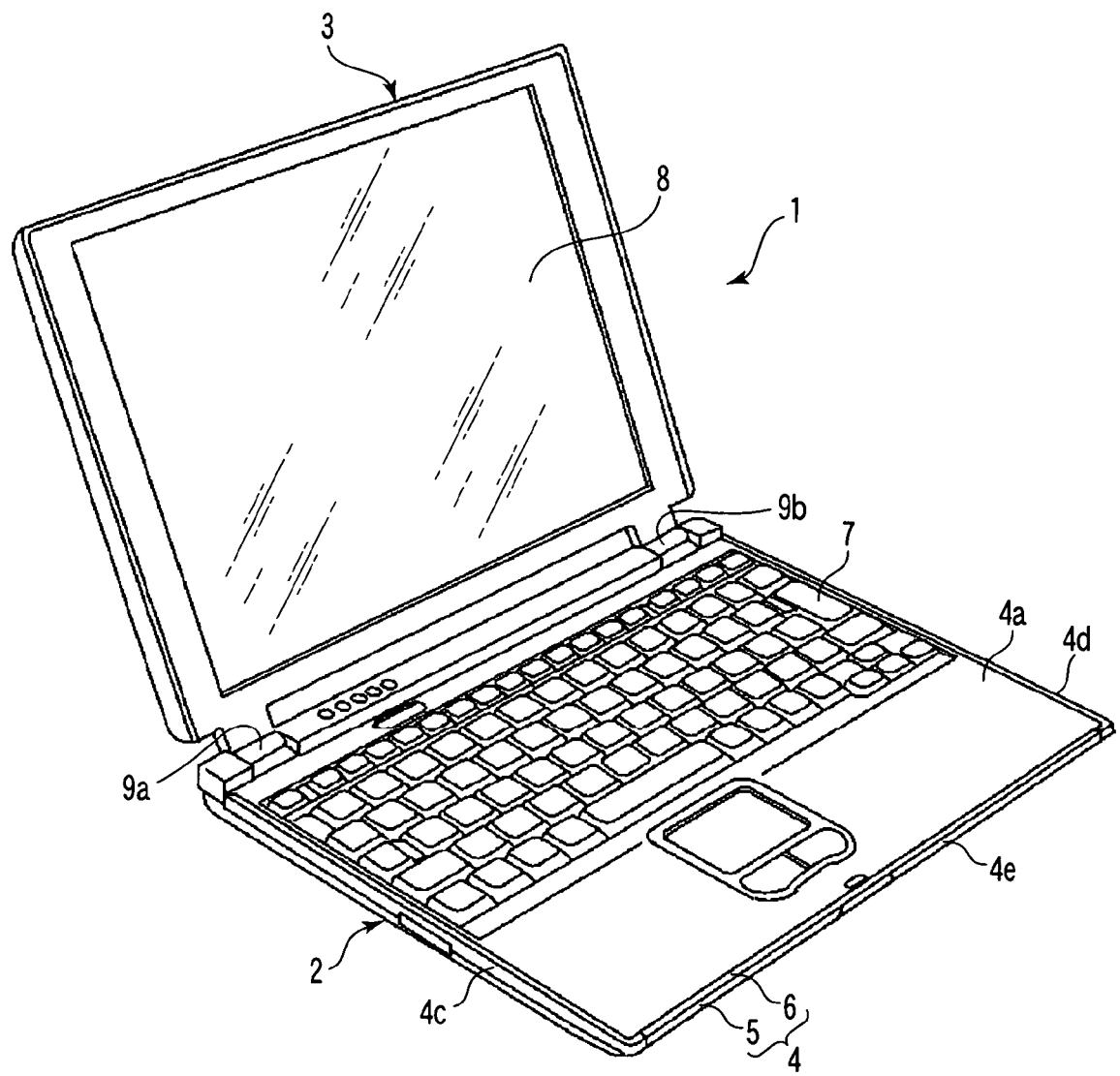
FIG. 1 is a perspective view of a notebook computer according to an embodiment of the present invention.
Figure 2:
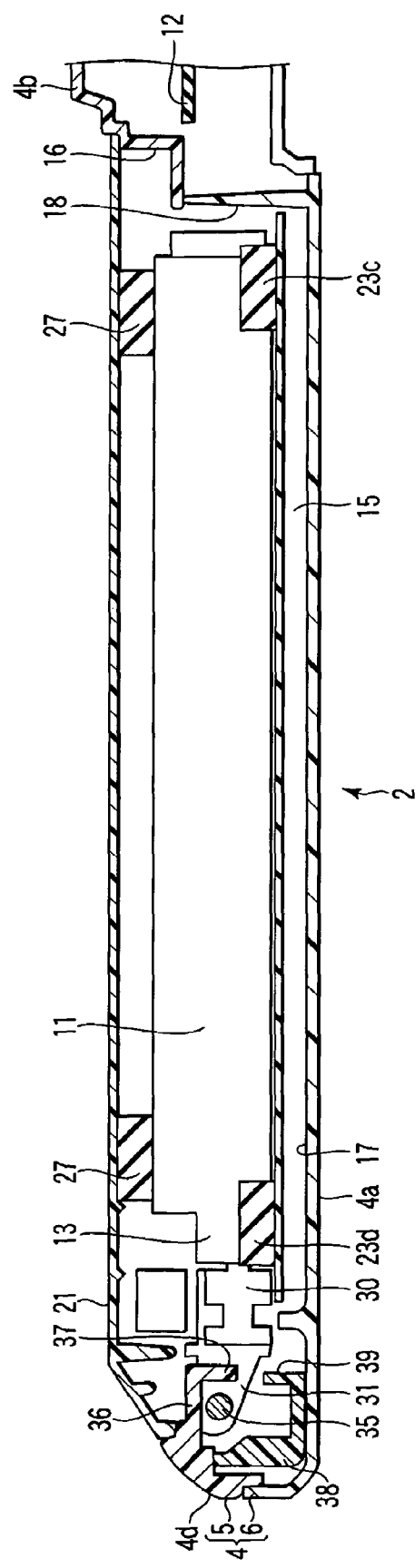
FIG. 2 is a cross-sectional view of the notebook computer according to the embodiment, illustrating a state where an HDD is accommodated in a receptacle of a housing.
Figure 3:
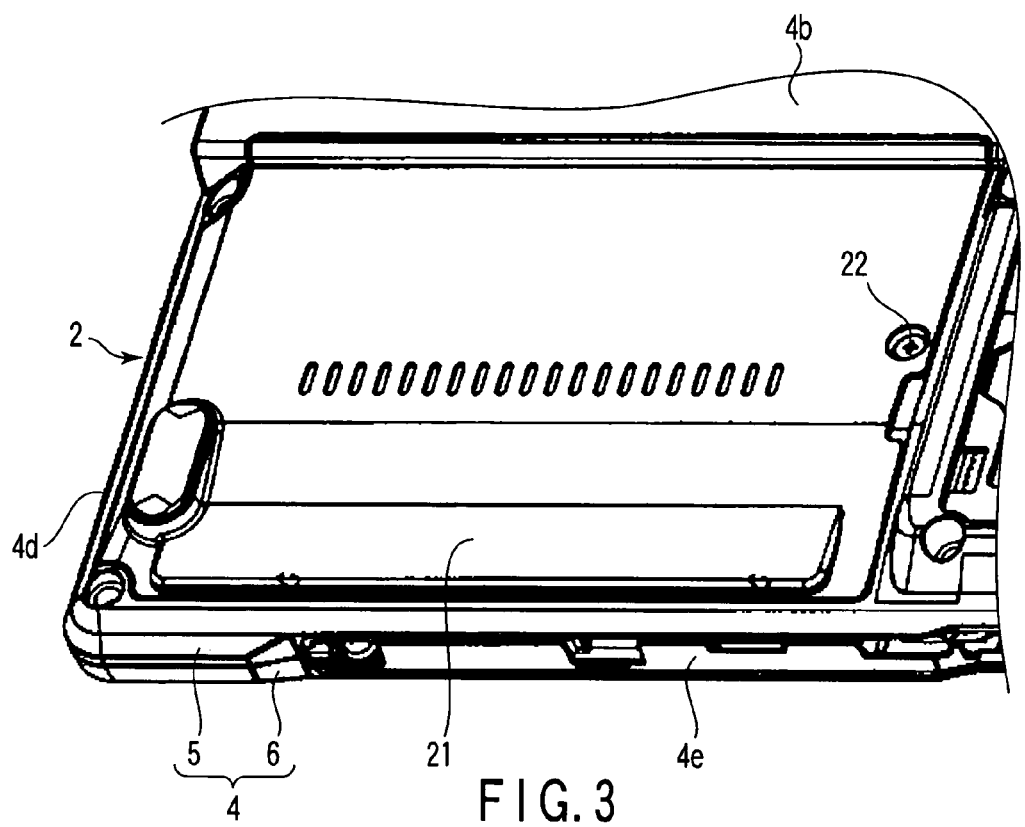
FIG. 3 is a perspective view of the notebook computer according to the embodiment, illustrating a state where the receptacle is covered with a lid.

FIGS. 1 and 2 illustrate a notebook computer 1 being an example of an electronic apparatus. The notebook computer 1 comprises a main body 2 and a display 3. The main body 2 has a housing 4. The housing 4 has a flat box shape and has a top wall 4a, a bottom wall 4b, left and right side walls 4c and 4d, a front wall 4e and a rear wall (not shown).

The housing 4 is formed of a base 5 and a top cover 6. The base 5 has the bottom wall 4b, the left and right side walls 4c and 4d, the front wall 4e and the rear wall. The top cover 6 has the top wall 4a. The top wall 4a supports a keyboard 7.

The display 3 has a liquid crystal display panel 8. The display 3 is connected to a rear end portion of the housing 4 via a pair of hinge portions 9a and 9b. The display 3 is rotatable between a closed position in which the display 3 lies on the housing 4 to cover the keyboard 7, and an open position in which the display 3 stands to expose the keyboard 7.

Figure 4:
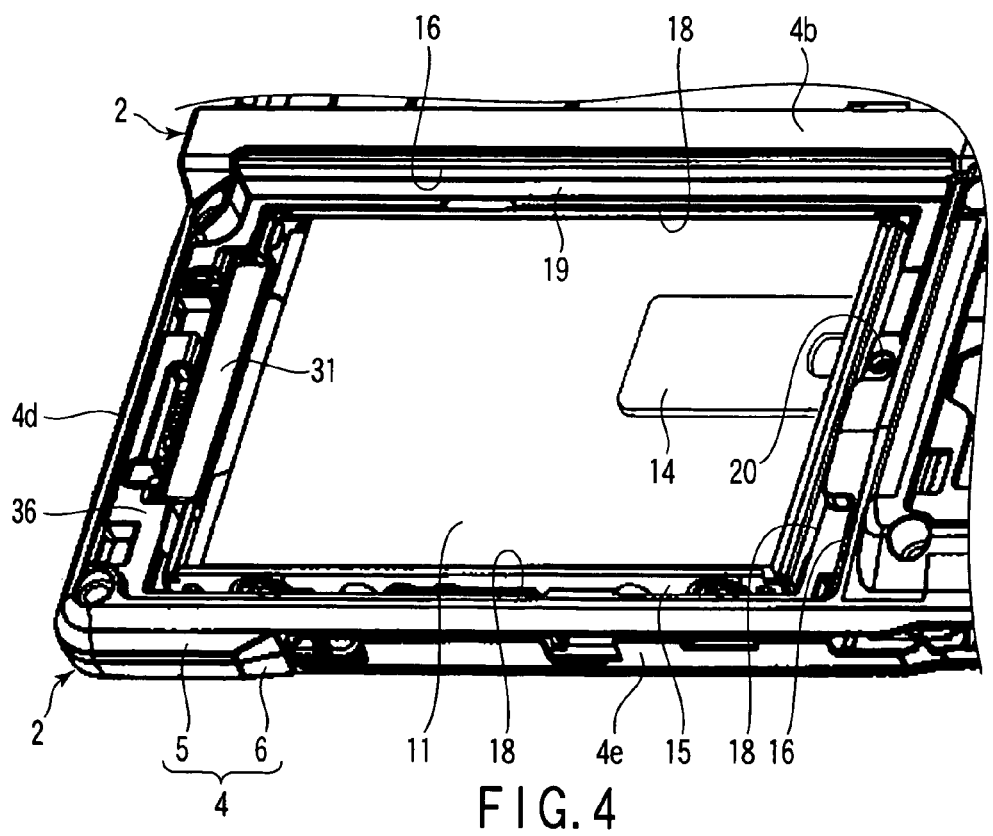
FIG. 4 is a perspective view of the notebook computer according to the embodiment, illustrating the state where the HDD is accommodated in the receptacle of the housing.

As shown in FIG. 2, the housing 4 accommodates an HDD 11 and a printed circuit board 12. The HDD 11 is an example of a disk drive. The HDD 11 is fabricated as a separate unit. The HDD 11 has a flat rectangular box shape, and has a first connector 13 at one end. As shown in FIG. 4, an eject ribbon 14 is attached to a bottom surface of the HDD 11. The eject ribbon 14 is held by fingertips when the HDD 11 is removed from the housing 4. The eject ribbon 14 is located on the other end of the HDD 11, which is opposite to the end where the first connector 13 is located.

FIGS. 3 to 7 illustrate states where the base 5 of the housing 4 are viewed from the bottom. As shown in FIG. 4, a receptacle 15 which accommodates the HDD 11 is provided in a bottom portion of the housing 4. The receptacle 15 is a recess having almost the same size as that of the HDD 11, and is formed as one unitary piece with the base 5. The receptacle 15 has a rectangular opening portion 16 opened in the bottom wall 4b of the base 5, a ceiling wall 17 which faces the opening portion 16, and three peripheral walls 18 surrounding the opening portion 16.

The opening portion 16 is used to drop the HDD 11 in and take it out of the receptacle 15. A receiving portion 19 is formed in an opening edge portion of the opening portion 16. The receiving portion 19 is more depressed than the surface of the bottom wall 4b, and has a screw hole 20. The opening portion 16 of the receptacle 15 is covered with a removable lid 21. The lid 21 is placed, at its peripheral portion, on the receiving portion 19. The lid 21 is held by the receiving portion 19 with a screw 22. The screw 22 is screwed into the screw hole 20 through the lid 21.

Figure 5:
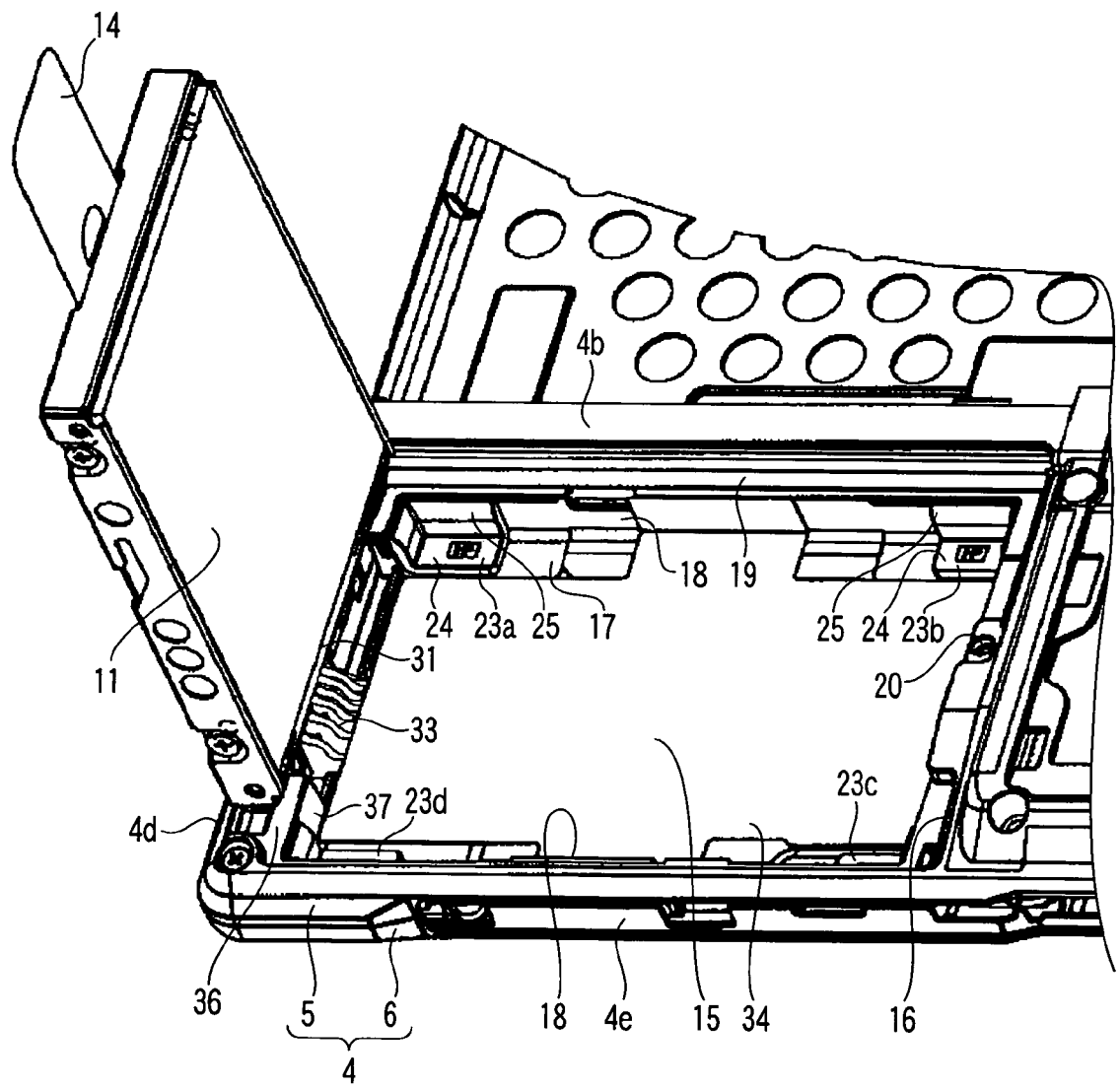
FIG. 5 is a perspective view of the notebook computer according to the embodiment, illustrating a state where the HDD is removed from the receptacle of the housing.
Figure 6:
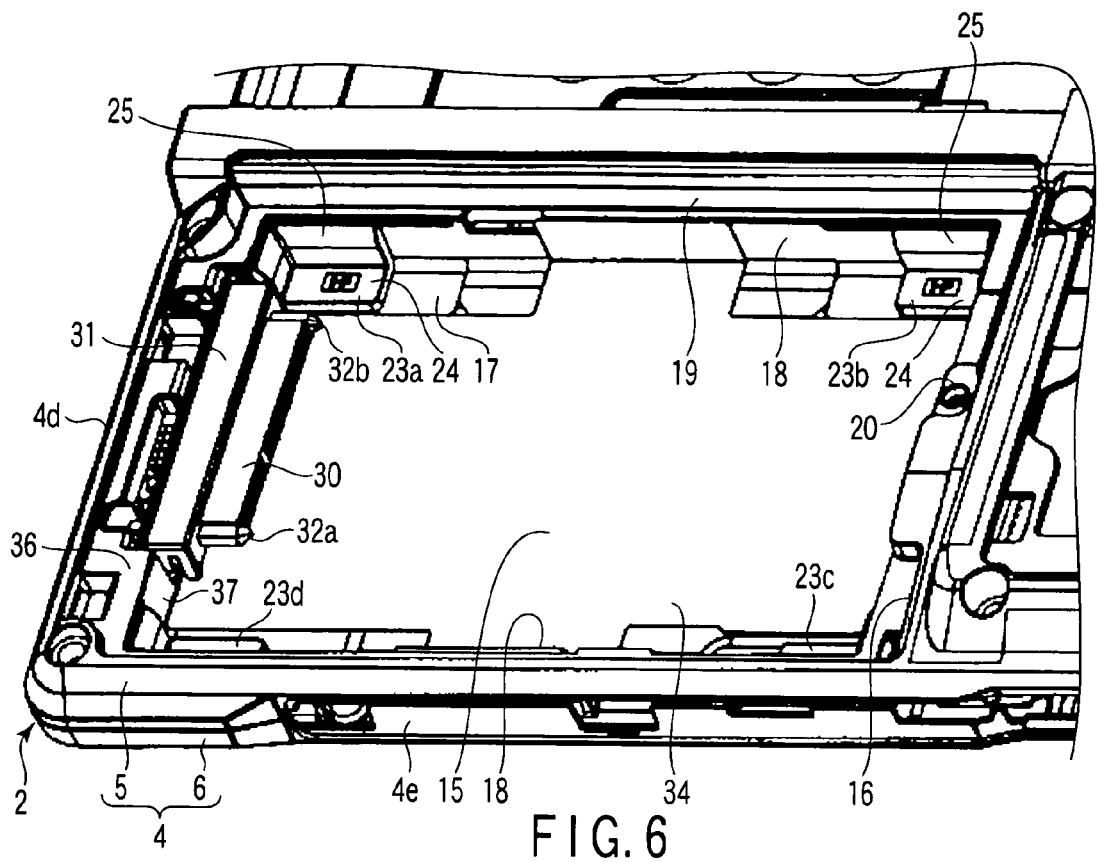
FIG. 6 is a perspective view of the embodiment, illustrating a state where a second connector is rotated to an accommodating position (first position).
Figure 7:
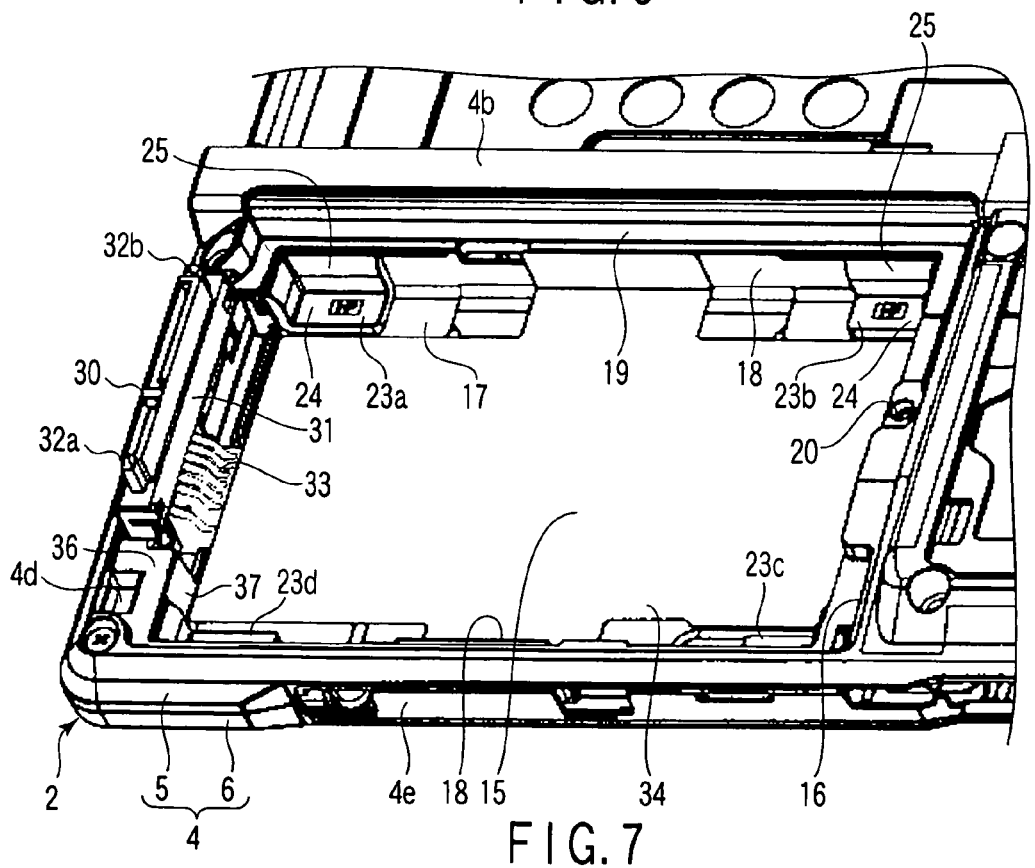
FIG. 7 is a perspective view of the embodiment, illustrating a state where the second connector is rotated to a standing position (second position).

As shown in FIGS. 5 to 7, four first shock absorbent members 23a, 23b, 23c and 23d are provided on the receptacle 15. The first shock absorbent members 23a, 23b, 23c and 23d are formed of, for example, rubber, and have elasticity such that shock is not easily transmitted to the HDD 11. The first shock absorbent members 23a, 23b, 23c, and 23d are arranged in four corners of the receptacle 15 to correspond to four corner portions of the HDD 11.

Each of the first shock absorbent members 23a, 23b, 23c and 23d has a first portion 24 and a second portion 25. The first portions 24 are provided on the ceiling wall 17 of the receptacle 15 in such a manner of contacting a top surface of the HDD 11. The second portions 25 are provided on the peripheral walls 18 of the receptacle 15 in such a manner of contacting peripheral surfaces of the HDD 11. Therefore, the first shock absorbent members 23a, 23b, 23c and 23d are configured to be interposed between the receptacle 15 and the HDD 11 and absorb shock transmitted from the housing 4 to the HDD 11.

As shown in FIG. 2, a plurality of second shock absorbent members 27 are provided on an internal surface of the lid 21. The second shock absorbent members 27 are formed of, for example, rubber, and have elasticity such that shock is not easily transmitted to the HDD 11. The second shock absorbent members 27 are stuck to the internal surface of the lid 21 by adhesive tape (not shown) to correspond to the four corner portions of the HDD 11. The second shock absorbent members 27 contact a bottom surface of the HDD 11 to absorb shock transmitted from the lid 21 to the HDD 21, when the lid 21 is secured to the receiving portion 19 of the receptacle 15.

As shown in FIGS. 2 and 4 to 7, a second connector 30 is provided in the receptacle 15. The first connector 13 of the HDD 11 is removably connected to the second connector 30. The second connector 30 is located at one end of the receptacle 15, and held by a connector base 31. The connector base 31 has a pair of guide pins 32a and 32b. The guide pins 32a and 32b are engaged with the first connector 13 prior to the second connector 30, when the first connector 13 is connected to the second connector 30. This engagement determines relative positions of the first connector 13 and the second connector 30, and the connectors 13 and 30 are smoothly connected.

Further, the second connector 30 is electrically connected to the printed circuit board 12 by a cable 33. The cable 33 is guided inside the housing 4 along the ceiling wall 17 of the receptacle 15. The cable 33 is covered with an insulator sheet 34 from a direction of the receptacle 15. The insulator sheet 34 is interposed between the top surface of the HDD 11 and the ceiling wall 17 of the receptacle 15, when the HDD 11 is accommodated in the receptacle 15.

Figure 8:
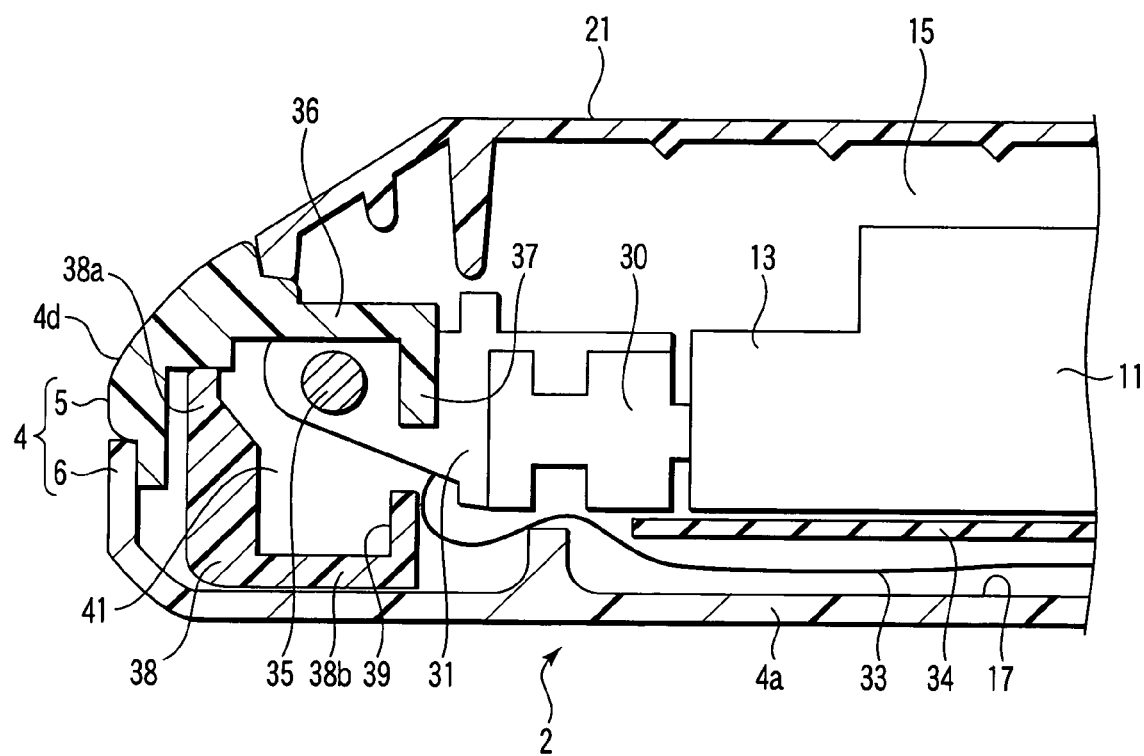
FIG. 8 is a cross-sectional view of the notebook computer of the embodiment, illustrating the state where the second connector is rotated to the accommodating position (first position).

As shown in FIGS. 2, 6 and 8, the connector base 31 extends in a depth direction of the housing 4 and along the right side wall 4d of the base 5. The connector base 31 has a support shaft 35 in its distal end portion. The support shaft 35 extends in a longitudinal direction of the connector base 31.

The base 5 has an extending portion 36, which horizontally projects from the side wall 4d toward said one end of the receptacle 15. A first engaging piece 37 extending toward the ceiling wall 17 of the receptacle 15 is formed on a distal end of the extending portion 36. A support member 38 is provided on said one end of the receptacle 15. The support member 38 is interposed between the base 5 and the top cover 6 to correspond to the extending portion 36. The support member 38 is secured to the receptacle 15 by a screw (not shown).

The support member 38 has an L-shaped cross section. An end portion 38a of the support member 38 is pressed against the internal surface of the base 5. The other end portion 38b of the support member 38 is opposed to the extending portion 36. A second engaging piece 39 is formed on a distal end of the other end portion 38b of the support member 38. The second engaging piece 39 extends toward the extending portion 36 and is opposed to the first engaging piece 37.

As shown in FIG. 8, the extending portion 36 of the base 5 and the support member 38 form a space 41 in cooperation with each other. The space 41 is located at said one end of the receptacle 15. The support shaft 35 of the connector base 31 movably enters the space 41. In other words, the support shaft 35 of the connector base 31 is floatingly supported by the housing 4 with the space 41. Thereby, the second connector 30 supported by the connector base 31 is rotatably held by the receptacle 15 between an accommodated position being a first position and a standing position being a second position, with the support shaft 35 used as a pivot.

More specifically, FIGS. 4, 6 and 8 illustrate a state where the second connector 30 is rotated to the accommodated position. The term "accommodated position" indicates the position of the second connector 30 when the HDD 11 is accommodated in the receptacle 15. In the accommodated position, the second connector 30 falls down to extend along the ceiling wall 17 of the receptacle 15, and is opposed to the first connector 13 of the HDD 11 accommodated in the receptacle 15.

Figure 9:
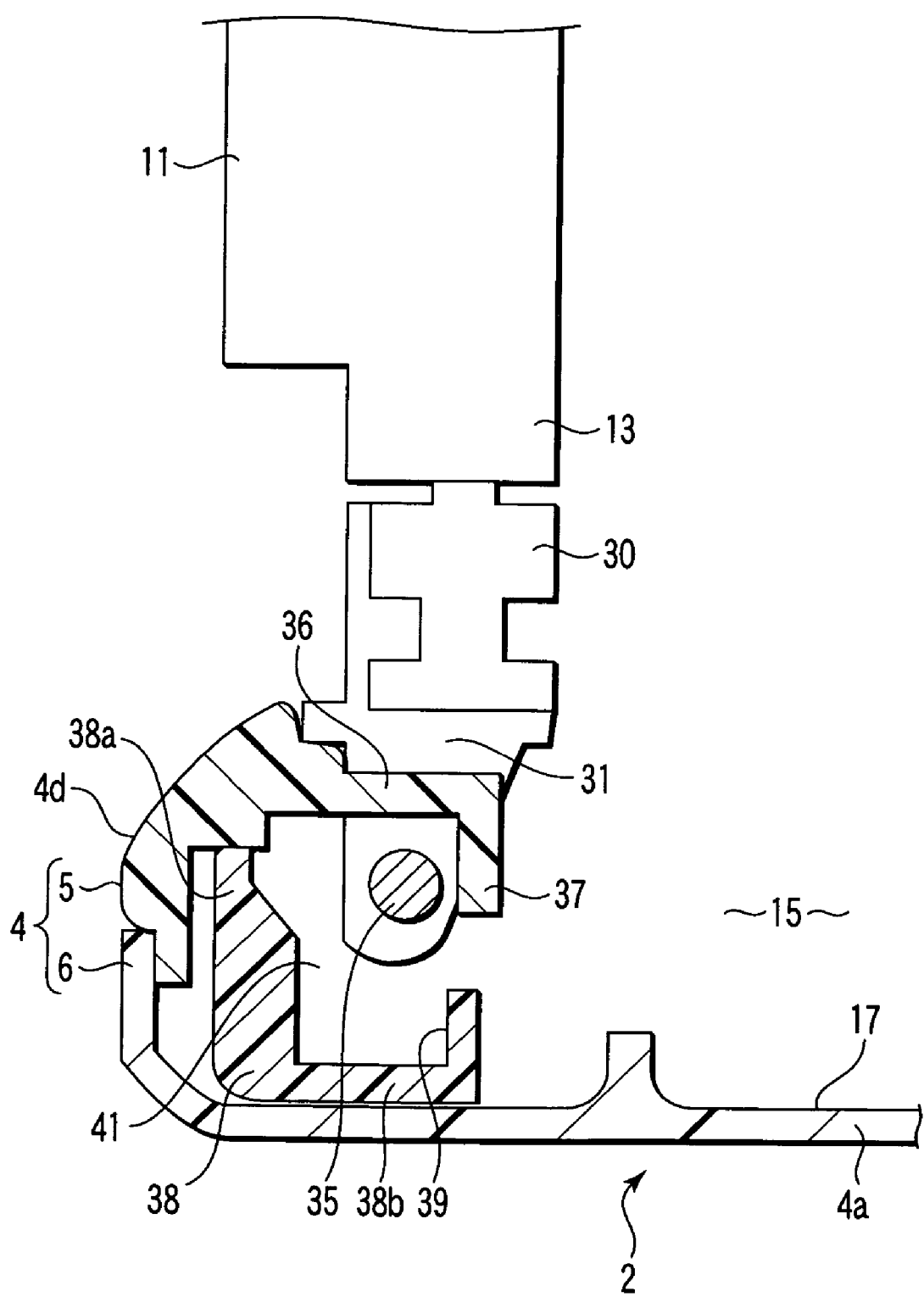
FIG. 9 is a perspective view of the notebook computer of the embodiment, illustrating the state where the second connector is rotated to the standing position (second position).

On the other hand, FIGS. 5, 7, and 9 illustrate a state where the second connector 30 is rotated to the standing position. The term "standing position" indicates the position of the second connector 30, in which the HDD 11 is removed from the receptacle 15 or connected to the second connector 30. In the standing position, the second connector 30 stands in a direction perpendicular to the ceiling wall 17 of the receptacle 15, and is directed to the opening portion 16 of the receptacle 15.

Therefore, in the state where the lid 21 is removed from the opening portion 16, the HDD 11 is rotatable between the accommodated position and the standing position, together with the second connector 30.

When the HDD 11 is to be accommodated in the receptacle 15 in the embodiment having the above structure, first, the lid 21 is removed to expose the opening portion 16 of the receptacle 15. Next, the second connector 30 is rotated to the standing position, and the first connector 13 of the HDD 11 is connected to the second connector 30.

In this state, the second connector 30 is rotated from the standing position to the accommodated position together with the HDD 11. By this rotation, the HDD 11 enters the receptacle 15 through the opening portion 16, and the top surface and the peripheral surfaces of the HDD 11 are brought into contact with the first shock absorbent members 23a to 23d.

Lastly, the lid 21 is put on the opening portion 16 and secured to the base 5 by the screw 22. Thereby, the second shock absorbent members 27 are brought into contact with the bottom surface of the HDD 11. In other words, the HDD 11 is held between the first shock absorbent members 23a to 23d and the second shock absorbent members 27. As a result, the position of the HDD 11 to the receptacle 15 is fixed, and connection between the first connector 13 and the second connector 30 is maintained.

In the state where the HDD 11 is accommodated in the receptacle 15, the support shaft 35 of the connector base 31 is held in a state of floating in the space 41 without contacting the base 5 and the support member 38. Therefore, the second connector 30 is also floatingly held with respect to the base 5 to avoid receiving shock from the base 5.

The second connector 30 located in the receptacle 15 is rotatable between the accommodated position and the standing position. Therefore, when the HDD 11 is removed from the receptacle 15, the second connector 30 is rotated from the accommodated position to the standing position together with the HDD 11. Therefore, as shown in FIGS. 5 and 9, a part where the HDD 11 and the second connector 30 are connected can be pulled out of the receptacle 15, and the HDD 11 can be easily removed.

In the same manner, when the HDD 11 is connected to the second connector 30, the second connector 30 can be pulled out of the receptacle 15. This enables easy connection between the HDD 11 and the second connector 30.

Further, in the state where the HDD 11 is accommodated in the receptacle 15, the HDD 11 is held between the first shock absorbent members 23a to 23d and the second shock absorbent members 27. Therefore, shock is not easily transmitted from the housing 4 to the HDD 11. In addition, the second connector 30 is also floatingly held in the receptacle 15. This prevents transmission of shock between the housing 4 and the second connector 30, and transmission of shock from the second connector 30 to the HDD 11. This improves the shock resistance of the HDD 11.

Furthermore, the HDD 11 is held in the receptacle 15 by securing the lid 21 to the base 5. This eliminates the need for a dedicated screw for securing the HDD 11 to the receptacle 15. This enables easy assembly of the computer 1 and reduction of the cost of the computer 1.

The electronic apparatus according to the present invention is not limited to notebook computers. For example, the present invention is also applicable to PDAs (Personal Digital Assistant) having no display.

Further, the disk drive is not limited to HDDs, but may be an optical disk drive, for example.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus comprising:
   a main body having a receptacle;
   a connector provided in the receptacle, the connector including a base having a support shaft, the connector being rotatable between an accommodated position and a standing position with the support shaft used as a pivot, and the support shaft is floatingly supported in the receptacle;
   a disk drive accommodated in the receptacle, the disk drive being removably connected to the connector and rotatable together with the connector;
   a lid which is removably put on the receptacle;
   a first shock absorbent member provided between the receptacle and the disk drive; and
   a second shock absorbent member provided between the lid and the disk drive.

2. The electronic apparatus according to claim 1, wherein the first shock absorbent member is located on the receptacle, and the second shock absorbent member is located on the lid.

3. The electronic apparatus according to claim 1, wherein the disk drive is elastically held between the first and second shock absorbent members when the disk drive is accommodated in the receptacle, and the support shaft of the connector is apart from the receptacle when the disk drive is held between the first and second shock absorbent members.

4. An electronic apparatus comprising:
   a housing having a receptacle;
   a disk drive accommodated in the receptacle;
   a connector provided in the receptacle, the connector including a base having a support shaft, the connector being removably connected to the disk drive and rotatable between a first position in which the disk drive is accommodated in the receptacle and a second position in which the connector stands when the disk drive is removed from the receptacle with the support shaft used as a pivot, and the support shaft is floatingly supported in the receptacle;
   a lid which is removably put on the receptacle;
   a first shock absorbent member provided between the receptacle and the disk drive; and
   a second shock absorbent member provided between the lid and the disk drive.

* * * * *